US011403838B2

(12) United States Patent
Zhu et al.

(10) Patent No.: US 11,403,838 B2
(45) Date of Patent: Aug. 2, 2022

(54) IMAGE PROCESSING METHOD, APPARATUS, EQUIPMENT, AND STORAGE MEDIUM TO OBTAIN TARGET IMAGE FEATURES

(71) Applicant: BOE TECHNOLOGY GROUP CO., LTD., Beijing (CN)

(72) Inventors: Dan Zhu, Beijing (CN); Hanwen Liu, Beijing (CN); Pablo Navarrete Michelini, Beijing (CN); Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 96 days.

(21) Appl. No.: 16/959,786

(22) PCT Filed: Jan. 6, 2020

(86) PCT No.: PCT/CN2020/070424
§ 371 (c)(1),
(2) Date: Jul. 2, 2020

(87) PCT Pub. No.: WO2020/168844
PCT Pub. Date: Aug. 27, 2020

(65) Prior Publication Data
US 2021/0365710 A1    Nov. 25, 2021

(30) Foreign Application Priority Data
Feb. 19, 2019    (CN) .......................... 201910124973.9

(51) Int. Cl.
*G06V 10/40* (2022.01)
*G06K 9/62* (2022.01)
(Continued)

(52) U.S. Cl.
CPC ............ *G06V 10/40* (2022.01); *G06K 9/6262* (2013.01); *G06N 3/02* (2013.01); *G06T 11/60* (2013.01)

(58) Field of Classification Search
CPC .......... G06K 9/46; G06K 9/6262; G06N 3/02; G06N 3/0481; G06N 3/0454; G06N 3/08;
(Continued)

(56) References Cited

U.S. PATENT DOCUMENTS 10,424,087 B2 *  9/2019  Risser .................... G06T 11/00
10,891,723 B1 *  1/2021  Chung ................... G06N 20/00
(Continued)

FOREIGN PATENT DOCUMENTS

CN    106778928 A    5/2017
CN    107767328 A    3/2018
(Continued)

OTHER PUBLICATIONS

International Search Report dated Apr. 15, 2020, issued in counterpart Application No. PCT/CN2020/070424 (10 pages).

*Primary Examiner* — Maurice L. McDowell, Jr.
(74) *Attorney, Agent, or Firm* — WHDA, LLP

(57) ABSTRACT

An image processing method is disclosed. The image processing method may include inputting a first image and a third image to a pre-trained style transfer network model, the third image being a composited image formed by the first image and a second image; extracting content features of the third image and style features of the second image, normalizing the content features of the third image based on the style features of the second image to obtain target image features, and generating a target image based on the target image features and outputting the target image by using the pre-trained style transfer network model.

20 Claims, 10 Drawing Sheets

(51) Int. Cl.
*G06N 3/02* (2006.01)
*G06T 11/60* (2006.01)

(58) Field of Classification Search
CPC ... G06T 11/60; G06T 1/20; G06T 5/50; G06T 3/4038; G06T 2207/20221; G06V 10/40
See application file for complete search history.

(56) References Cited

U.S. PATENT DOCUMENTS

| | | | |
|---|---|---|---|
| 2009/0309894 A1* | 12/2009 | Lam | G06F 40/103 |
| | | | 345/582 |
| 2018/0240257 A1* | 8/2018 | Li | G06N 3/084 |
| 2018/0373999 A1 | 12/2018 | Xu | |
| 2019/0251401 A1* | 8/2019 | Shechtman | G06T 11/00 |
| 2019/0279075 A1* | 9/2019 | Liu | G06N 3/0472 |
| 2019/0340419 A1* | 11/2019 | Milman | G06N 3/088 |
| 2020/0134778 A1* | 4/2020 | He | G06K 9/4628 |
| 2020/0202502 A1* | 6/2020 | Tsymbalenko | G06T 5/50 |
| 2021/0049468 A1* | 2/2021 | Karras | G06N 3/0454 |

FOREIGN PATENT DOCUMENTS

| | | |
|---|---|---|
| CN | 108537720 A | 9/2018 |
| CN | 109191382 A | 1/2019 |
| CN | 109285112 A | 1/2019 |

* cited by examiner

IMAGE PROCESSING METHOD, APPARATUS, EQUIPMENT, AND STORAGE MEDIUM TO OBTAIN TARGET IMAGE FEATURES

CROSS-REFERENCE TO RELATED APPLICATIONS

This application claims benefit of the filing date of Chinese Patent Application No. 201910124973.9 filed on Feb. 19, 2019, the disclosure of which is hereby incorporated in its entirety by reference.

TECHNICAL FIELD

The present application relates to the field of image processing technologies, and in particular, to an image processing method, an apparatus, an equipment and a storage medium.

BACKGROUND

Image processing is a method to manipulate images through some procedures to change their visual content, analyze or extract information. Nowadays, image processing generally refers to digital image processing that relies on digital signal processing and computational algorithms to process images.

BRIEF SUMMARY

An embodiment of the present disclosure provides an image processing method. The image processing method may include: inputting a first image and a third image to a pre-trained style transfer network model, the third image being a composited image formed by the first image and a second image; extracting content features of the third image and style features of the second image, normalizing the content features of the third image based on the style features of the second image to obtain target image features, and generating a target image based on the target image features and outputting the target image by using the pre-trained style transfer network model.

Optionally, the pre-trained style network model may include an encoder, a normalizing network and a decoder that are connected in cascade. Extracting the content features of the third image and the style features of the second image, normalizing the content features of the third image based on the style features of the second image to obtain the target image features, and generating the target image based on the target image features and outputting the target image by using the pre-trained style transfer network model, may include: extracting the content features of the third image and the style features of the second image by the encoder; normalizing the content features of the third image based on the style features of the second image to obtain the target image features by the normalizing network; and generating the target image based on the target image features and outputting the target image by the decoder.

Optionally, the encoder may be a first visual geometry group network, including at least one convolutional block, a coding pooling layer, and a coding full connection layer; which are sequentially connected in cascade, the at least one convolutional block comprising a first convolutional block comprising at least one convolutional layer connected in cascade, and other convolutional blocks each comprising a pooling layer and at least one convolutional layer connected in cascade; the normalizing network may include an adaptive instance normalization processing layer, and the coding full connection layer may be connected to the adaptive instance normalization processing layer; and the decoder may be a residual network, a dense network, or a network symmetric with the encoder.

Optionally, the decoder may be the network symmetric with the encoder. The decoder may include a decoding full connection layer, a decoding pooling layer, and at least one deconvolution block, which are sequentially connected in cascade; the at least one deconvolution block may include a last deconvolution block comprising at least one deconvolutional layer of concatenation, and a resolution of the target image output by the last deconvolution block being the same as a resolution of the second image or the third image inputted into the encoder, and other deconvolution blocks comprising at least one deconvolutional layer and a pooling layer connected in cascade.

Optionally, the style transfer network model may be pre-trained by: inputting at least one set of a first sample image and a third sample image, the third sample image being formed by compositing the first sample image and a second sample image; and iteratively training an initial style transfer network model according to at least one set of the third sample image and the second sample image until a preset convergence condition is satisfied.

Optionally, each iterative training may include: inputting the current set of the third sample image and the second sample image into the initial style transfer network model or a style transfer network model trained in the previous iteration; extracting content features of the third sample image and style features of the second sample image by using the initial style transfer network model or the style transfer network model trained in the previous iteration, normalizing the content features of the third sample image based on the style features of the second sample image to obtain sample image features, and generating a corresponding result image based on the sample image features; determining a total image loss of the result image based on the second sample image, the sample image features, and the result image; correcting a weight parameter in the initial style transfer network model or the style transfer network model trained in the previous iteration to obtain the style transfer network model trained by the iteration based on the total image loss.

Optionally, determining the total image loss of the result image based on the second sample image, the sample image features, and the result image may include: inputting the second sample image, the sample image features, and the result image into an analysis network model; extracting the style features of the second sample image and result image features of the result image by the analysis network model; and inputting the resulting image features, the sample image features, and the style features of the second sample image into a preset loss function, and determining the total image loss by the loss function.

Optionally, the analysis network model may include a second visual geometry group network, including at least one convolution block, a coding pooling layer, and a coding full connection layer; the at least one convolution block, the coding pooling layer and the coding full connection layer may be sequentially connected in cascade, the at least one convolution block comprises a first convolution block including at least one cascaded convolution layer, and other convolution blocks each including a pooling layer and at least one convolution layer connected in cascade.

Optionally, inputting the result image features, the sample image features, and the style features of the second sample image into the preset loss function, and determining the total image loss by the loss function may include: inputting the result image features and the sample image features into a first loss function in the loss function, determining a difference between the result image features and the sample image features by using the first loss function, and determining a content loss of the result image based on the difference; inputting the result image features and the style features of the second sample image into a second loss function in the loss function, and determining a mean difference and a variance difference between the result image features and the style features of the second sample image by the second loss function, and determining a style loss of the result image based on the mean difference and the variance difference; and determining the total image loss based on the content loss, a weight of the content loss, the style loss, and a weight of the style loss.

Optionally, correcting the weight parameter in the initial style transfer network model or the style transfer network model trained in the previous iteration may include modifying weight parameter of the decoder in the initial style transfer network model or the style transfer network model trained in the last iteration.

Optionally, normalizing the content features of the third image based on the style features of the second image to obtain the target image features may include: adjusting a numerical range of the content features of the third image based on the mean and variance of the content features of the third image, so that the content features of the third image match the style features of the second image; and adding the style features of the second image to the content feature of the adjusted third image to obtain the target image features.

Optionally, the first image may have a first style features, the second image may have a second style features, the first style features and the second style features may be different.

Optionally, the second image may be an element copied from a photo, the first image may be a drawing.

Another embodiment of the present disclosure provides a neural network for smart image pasting. A first image and a third image may be inputted into the neural network for smart image pasting, the third image may be a composited image formed by the first image and a second image. The neural network for smart image pasting may include: an encode configured to extract content features of the third image and style features of the second image; a normalizing network configured to normalize the content features of the third image based on the style features of the second image to obtain target image features; a decoder configured to generate the target image based on the target image features and outputting the target image.

Optionally, the encoder may be a first visual geometry group network, including at least one convolutional block, a coding pooling layer, and a coding full connection layer; which may be sequentially connected in cascade, the at least one convolutional block comprising a first convolutional block comprising at least one convolutional layer connected in cascade, and other convolutional blocks each comprising a pooling layer and at least one convolutional layer connected in cascade; the normalizing network may include an adaptive instance normalization processing layer, and the coding full connection layer may be connected to the adaptive instance normalization processing layer; and the decoder may be a residual network, a dense network, or a network symmetric with the encoder.

Optionally, the first visual geometry group network may be a VGG16 network or a VGG19 network.

Optionally, the neural network for smart image pasting may further include: a model training module. The model training module may be configured to train the neural network for smart image pasting by: inputting at least one set of a first sample image and a third sample image, the third image being a composited image formed by the first image and a second image; performing iterative training on an initial neural network for smart image pasting based on at least one set of the third sample image and the second sample image until a preset convergence condition is satisfied.

Optionally, each iteration of training may include: inputting the current set of the third sample image and the second sample image into the initial neural network for smart image pasting or a neural network for smart image pasting trained in the previous iteration; extracting content features of the third sample image and style features of the second sample image by using the initial neural network for smart image pasting or the neural network for smart image pasting trained in the previous iteration, normalizing the content features of the third sample image based on the style features of the second sample image to obtain sample image features, and generating a corresponding result image based on the sample image features; determining a total image loss of the result image based on the second sample image, the sample image features, and the result image; and correcting a weight parameter in the initial neural network for smart image pasting or the neural network for smart image pasting trained in the previous iteration to obtain the neural network for smart image pasting trained by the iteration based on the total image loss.

Optionally, the model training module may include an analysis network model. The analysis network model may be configured to input the second sample image, the sample image features and the result image, extract the style features of the second sample image and result image features of the result image, and input the resulting image features, the sample image features and the style features of the second sample image into a loss function, and determine the total image loss by the loss function.

Optionally, the analysis network model may include a second visual geometry group network, including at least one convolution block, a coding pooling layer, and a coding full connection layer; the at least one convolution block, the coding pooling layer and the coding full connection layer are sequentially connected in cascade, the at least one convolution block comprises a first convolution block including at least one cascaded convolution layer, and other convolution blocks each including a pooling layer and at least one convolution layer connected in cascade.

Another embodiment of the present disclosure provides an image processing equipment. The image processing equipment may include: a memory and a processor, the memory storing a computer program. The computer program is executed by the processor to implement the image processing method.

Another embodiment of the present disclosure provides a computer readable storage medium, which storing a computer program, the computer program being executed by a processor to implement the image processing method.

BRIEF DESCRIPTION OF THE DRAWINGS

The above and/or additional aspects and advantages of the present application will become apparent and readily understood from the following description of the embodiments, wherein.

DETAILED DESCRIPTION

Figure 1:
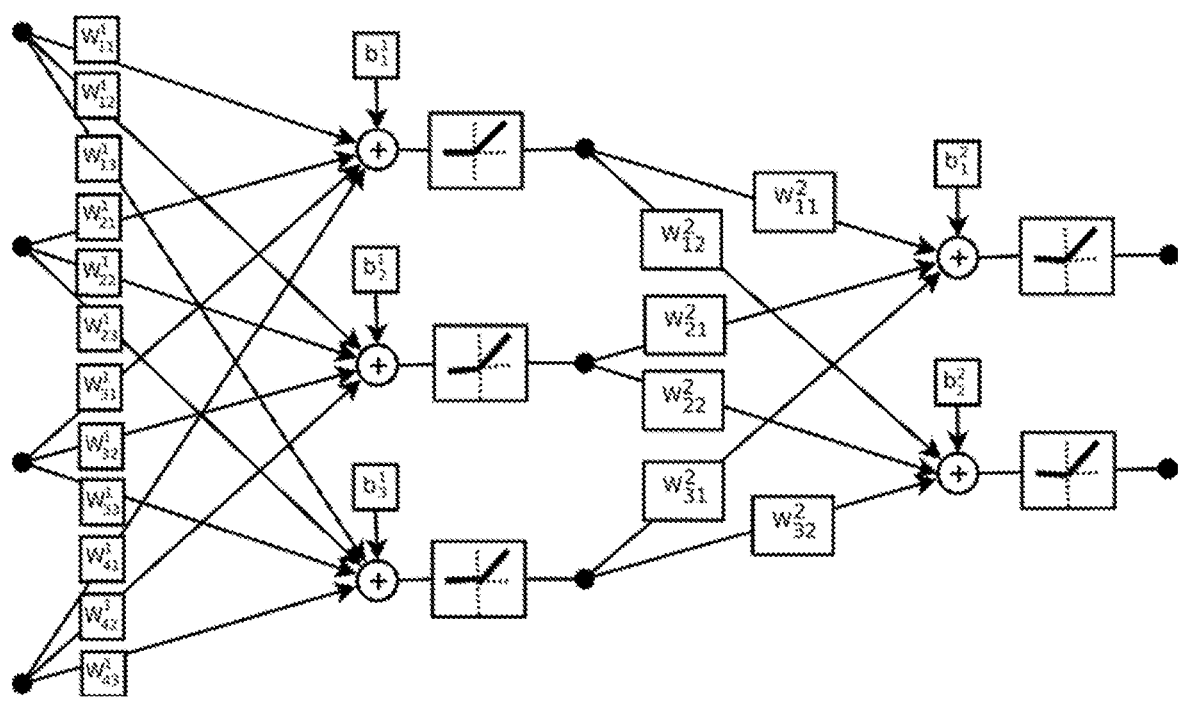
FIG. 1 is a schematic structural diagram of a convolutional neural network according to an embodiment of the present application.

The present application is described in detail below, and examples of embodiments of the present application are illustrated in the accompanying drawings, wherein the same or similar reference numerals refer to the same or similar components or components having the same or similar functions. Further, if a detailed description of a known technique is unnecessary for the features of the present application shown, it will be omitted. The embodiments described below with reference to the accompanying drawings are intended to be illustrative only, and are not to be construed as limiting.

Those skilled in the art will appreciate that all terms (including technical and scientific terms) used herein have the same meaning as commonly understood by one of ordinary skill in the art to which this disclosure belongs, unless otherwise defined. It should also be understood that the terms such as those defined in a general dictionary should be understood to have meaning consistent with the meaning in the context of the prior art. Unless it is specifically defined as here, it will not be interpreted in an idealized or overly formal meaning.

Those skilled in the art can understand that unless specifically stated, the singular forms "a," "one," "the," and "said" used here may include plural form. It will be further understood that the phrase "comprising" used in the specification of the application, means that the features, integers, steps, operations, elements and/or components are present. However, it is not excluded that one or more other features, integers, steps, operations, elements, components, and/or combinations thereof are present. It will be understood that when an element is referred to as being "connected" or "coupled" to another element, it can be directly connected or coupled to the other element or intermediate elements may also be present. Further, "connected" or "coupled" as used herein may include either a wireless connection or a wireless coupling. The phrase "and/or" used herein includes all or any one and all combinations of one or more of the associated listed.

First several terms and principle involved in this application are introduced and explained herein:

Smart image pasting refers to pasting an element copied from a photo into a drawing and completely blending the element into the drawing, called a smart image pasting.

Convolutional Neural Network:

Convolutional neural networks are a special structure of neural networks that use images as input and output of the system and replace the weights of scalars with convolution kernels. A three-layer convolutional neural network is shown in FIG. 1. The network has 4 inputs, 3 outputs in the hidden layer, 2 outputs in the output layer, and the final system outputs two images. Each module $w_{ij}^k$ represents a convolution kernel. k represents the input layer number, and i and j represent the unit numbers of the input and output, respectively. The offset $b_i^k$ is a set of scalars superimposed on the output of the convolutional layer. The convolutional layer output with the offset superimposed will then go to the active layer (usually the RELU or sigmoid function). After training, the system's convolution kernel and offset are fixed. The training is to optimize parameters of the convolution kernel and the offset through a set of matched input and output and optimization algorithms. Typically, each convolutional layer can contain tens or hundreds of convolution kernels, and deep neural networks often contain more than 5 convolutional layers.

Pooling Layer:

The pooled layer is a form of downsampling that reduces the size of the convolution features. Common pooling layers include max-pooling, avg-pooling, decimation, and demuxout.

Instance Normalization (IN) Layer:

Instance Normalization layer is used to normalize the feature image output from the convolutional layer. Assuming that the size of the mini-batch is T, the number of features outputted by a convolutional layer is C, and each feature image is a matrix of H rows and W columns, the shape of the feature image is (T, C, W, H), the standardized formula for Instance Normalization is as follows:

$$y_{tijk} = \frac{x_{tijk} - \mu_{ti}}{\sqrt{\sigma_{ti}^2 + \varepsilon}},$$

$$\mu_{ti} = \frac{1}{HW}\sum_{l=1}^{W}\sum_{m=1}^{H} x_{tilm},$$

$$\sigma_{ti}^2 = \frac{1}{HW}\sum_{l=1}^{W}\sum_{m=1}^{H}(x_{tilm} - m\mu_{ti})^2$$

Wherein, $x_{tijk}$ represents the value of the t-th patch, the i-th feature image, the j-th column, and the k-th row in the feature image set outputted by a convolutional layer; $y_{tijk}$ represents the result of $x_{tijk}$ inputted into the Instance Normalization layer; and ε is a small integer, avoiding the denominator as 0.

The technical solutions of the present application are described in detail in the following specific embodiments to solve the above technical problems. The following specific embodiments may be combined with each other, and the same or similar concepts or processes may not be described in some embodiments. Embodiments of the present application will be described below with reference to the accompanying drawings.

When the existing image processing algorithm synthesizes different images, the two images are usually simply combined. As such, the two images cannot be deeply blended to highly harmonize the styles of the two images.

In order to improve the synthesis effect, the prior art generally optimizes the pixel values of the combined images, but the improvement of the synthesis effect is not significant. Furthermore, a same pixel optimization method cannot be applied to different styles of images, so it cannot be applied to the field of smart image pasting to meet the needs of smart image pasting.

Figure 2:
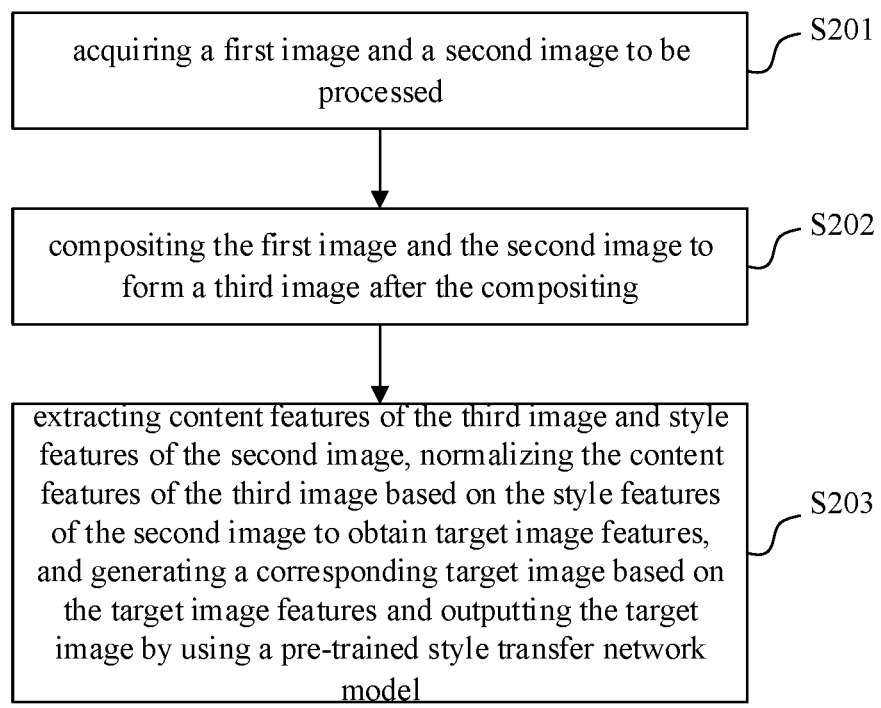
FIG. 2 is a schematic flowchart of an image processing method according to an embodiment of the present application.

An embodiment of the present disclosure provides an image processing method. As shown in FIG. 2, the image processing method includes:

Step S201 includes acquiring a first image and a second image to be processed.

The first image and the second image may be selected according to actual needs, for example, two images of different styles.

In Step S202, the first image and the second image are composited to form a third image after the compositing.

In one example, that the first image and the second image are composited may be that the first image and the second image are stitched together, that the first image having a smaller size is pasted onto the second image having a larger size, or that the first image and the second image are partially overlapped to form a new image. Those skilled in the art can understand that other compositing methods are also possible, and are not enumerated here.

Step S203 includes extracting content features of the third image and style features of the second image by using a pre-trained style transfer network model, normalizing the content features of the third image based on the style features of the second image to obtain target image features after the processing, and generating and outputting a corresponding target image based on the target image features.

Optionally, normalizing the content features of the third image based on the style features of the second image to obtain target image features after the processing includes adjusting a numerical range of the content features of the third image according to the mean and variance of the content features of the third image, so that the content features of the third image match the style features of the second image; adding the style features of the second image to the content features of the adjusted third image to obtain the target image features.

Optionally, the style transfer network model includes: an encoder, a normalizing network, and a decoder connected in cascade; and the step S203 includes:

Extracting the content features of the third image and the style features of the second image by the encoder; normalizing the content features of the third image based on the style features of the second image by the normalizing network to obtain the processed target image features; and generating and outputting the corresponding target image based on the target image features by the decoder.

Optionally, the encoder may be configured to transfer the third image and the second image from the image space to the feature space, thereby extracting the content features of the third image and the style features of the second image. Optionally, the encoder is specifically a Visual Geometry Group (VGG) network, including at least one convolution block, a coding pooling layer, and a coding full connection layer; The convolutional blocks, the coding pooling layer and the coding full connection layer are sequentially connected in cascade, and the first convolutional block includes at least one cascaded convolutional layer, and other convolutional blocks each include a cascaded pooling layer and at least one convolutional layer.

The specific type of the VGG network can be selected according to actual needs, such as a VGG16 network or a VGG19 network.

Figure 3:
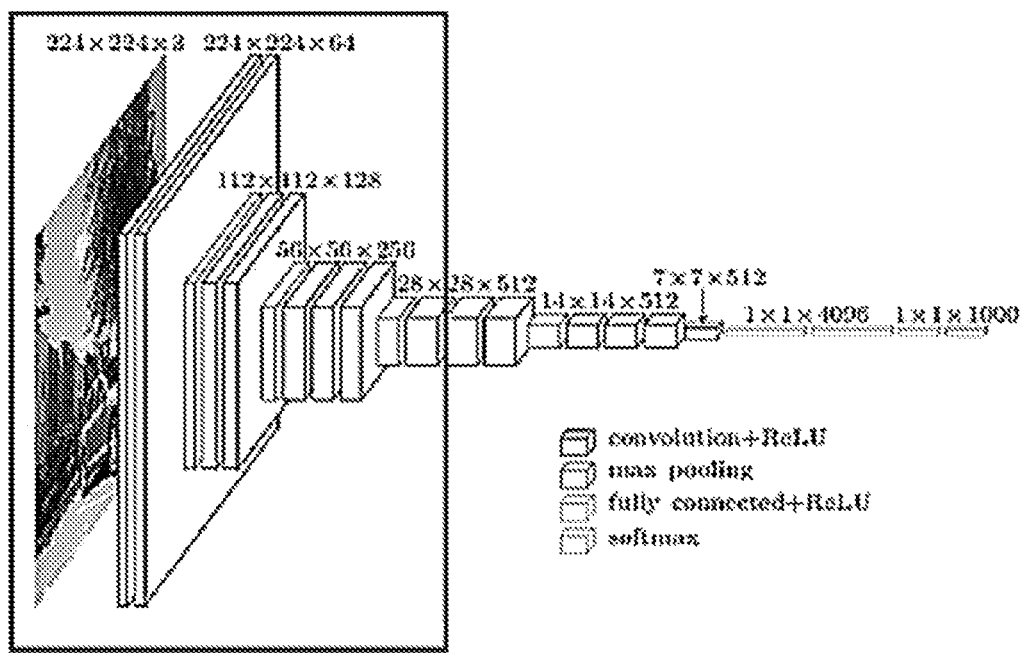
FIG. 3 is a schematic structural diagram of a VGG16 network according to an embodiment of the present application.

Optionally, the structure of the VGG16 network is as shown in FIG. 3, each cube or cuboid in FIG. 3 represents a layer, and the cubes or cuboids having the same size form a same ladder (convolution block, code pooling layer or coding full connection layer). The first layer of each ladder from left to right in FIG. 3 (except the last ladder) is the max pooling layer, the first three layers from left to right in the last ladder in FIG. 3 are full connection layer (fully connected+Relu), the last layer from left to right in the last ladder in FIG. 3 is the activation layer (softmax), and the remaining layers in FIG. 3 are convolution layers (convolution+Relu). The meaning and function of each layer are present arts and will not be described in the present application.

When the VGG16 network shown in FIG. 3 is employed as the encoder in the style transfer network model, the third image and the second image can be transferred from the image space to the feature space by using only the Relu_1 portion (i.e., the part inside the rectangular box in FIG. 3, Relu represents an activation function) in FIG. 3.

The normalizing network may be used to normalize the content features according to the style features. Optionally, the normalizing network includes an Adaptive Instance Normalization (AdaIN) processing layer, and the coding full connection layer is connected to the AdaIN processing layer. Specifically, the AdaIN processing layer can match the content features of each channel with the style features of each channel by the following expression, thereby transferring the style features of the second image to the third image:

$$AdaIN(x, y) = \sigma(y)\left(\frac{x - \mu(x)}{\sigma(x)}\right) + \mu(y)$$

In this expression, $\mu(x)$ and $\mu(x)$ are the mean and variance of the content features of each channel in the third image, respectively, $\mu(y)$ and $\sigma(y)$ are the mean and variance of the style features of each channel in the second image, respectively.

The decoder can be used to transfer the features after processing by the normalizing network from the feature space to the image space. Optionally, the decoder is specifically any one of a residual network, a dense network, and a network symmetric with the encoder. When the decoder is a network symmetric with the encoder, the decoder includes a decoding full connection layer, a decoding pooling layer and at least one deconvolution block which are sequentially cascaded. The adaptive instance normalization processing layer is connected to the coding full connection layer. The last deconvolution block includes at least one cascaded convolutional layer, and the resolution of the target image output by the last deconvolution layer is the same as the resolution of the second image or the third image of the input encoder. The other deconvolution blocks include at least one of the convolutional layer and the pooling layer connected in cascade. The weighting parameters of the decoder portion can be determined during the pre-training process of the style transfer network model.

Optionally, the style transfer network model is trained by the following: acquiring at least one set of the first sample image and the second sample image; compositing the first sample image and the second sample image in each set to form a third sample image after the compositing; iteratively training the initial style transfer network model according to at least one set of the third sample image and the second sample image until a preset convergence condition is satisfied.

Figure 4A:
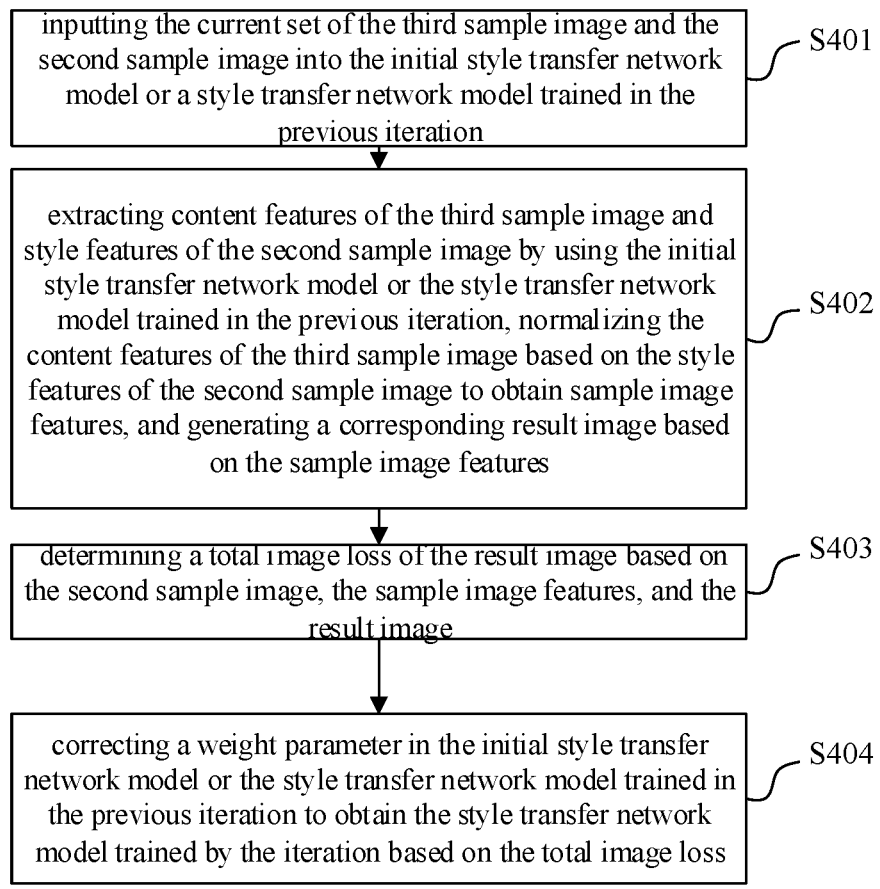
FIG. 4A is a schematic flowchart of an iterative training method of a style transfer network model in an embodiment of the present application.

Optionally, as shown in FIG. 4A, each iterative training includes the following steps S401-S404:

Step S401 includes inputting the current set of the third sample image and the second sample image into the initial style transfer network model or the style transfer network model trained in the last iteration.

Figure 4B:
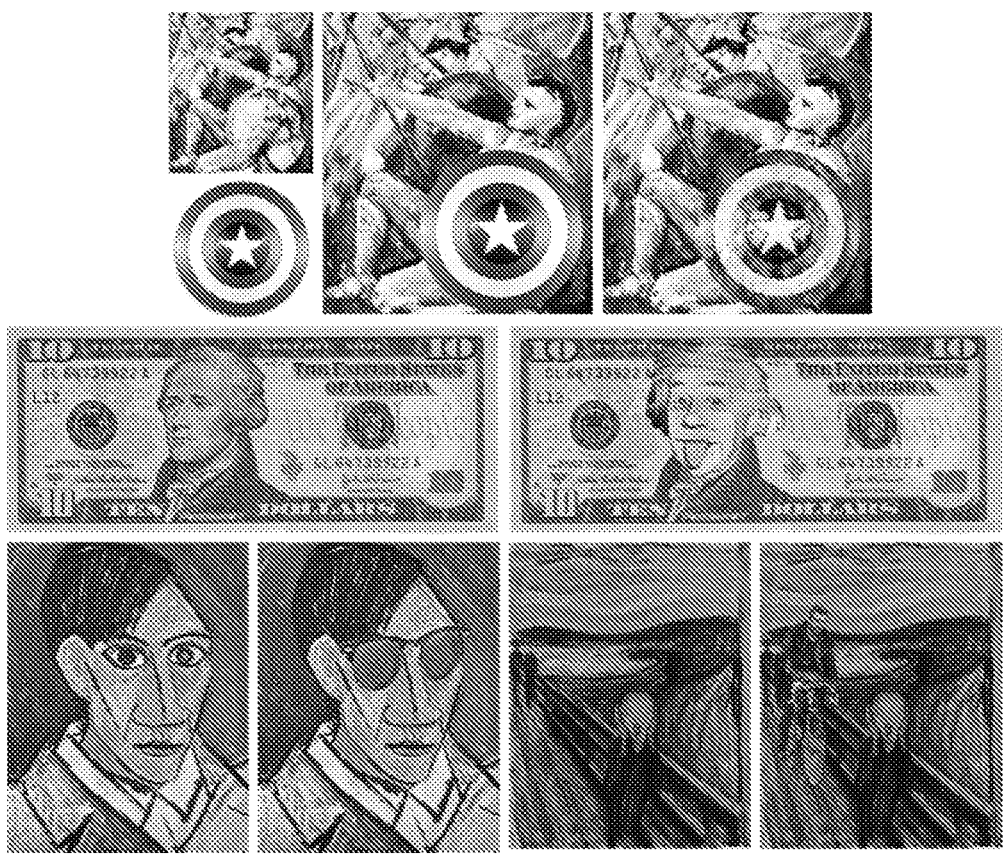
FIG. 4B shows examples of style transfer results using an image processing method according to an embodiment of the present disclosure.

In some embodiments, as shown FIG. 4B, the image process method creates new visual content blended in the original images. Distinct painting styles are shown in the original images on the left side of FIG. 4B. After the compositing, the resulted images still look like genuine images and share the same style of the original ones. Both the content features and style features are deeply blended in spite of the distinct differences. The image process method can be applied to the field of smart image pasting to achieve real-time and fast smart image pasting.

Figure 5:
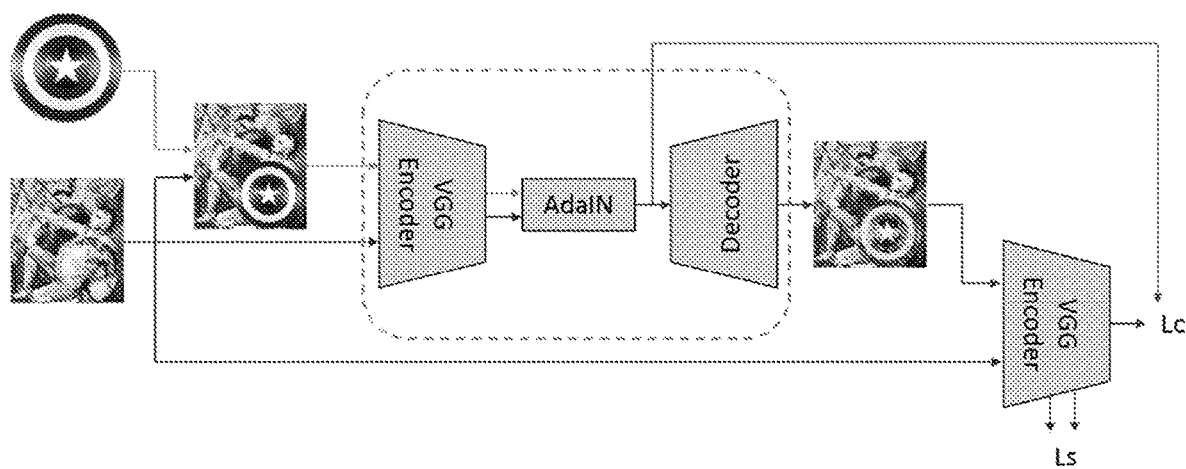
FIG. 5 is a diagram showing an example of a training principle of a style transfer network model in an embodiment of the present application.

Each iterative training process is shown in FIG. 5, and the training process in FIG. 5 is advanced from left to right.

The network models in the dashed box in FIG. 5 all represent an initial style transfer network model that has not been trained in the iterative training method described in one embodiment of the present application or a style transfer network model that was trained in the previous iteration.

In FIG. 5, the two images input to the dashed box on the left side are the third sample image and the second sample image, respectively. Specifically, the upper image of the two images input into the dashed box is the third sample image, and the lower human image is the second sample image. Wherein, the third sample image is composited from a first sample image (the shield image on the left side of FIG. 5) and the second sample image.

S402 Includes extracting content features of the third sample image and style features of the second sample image by using an initial style transfer network model or a style transfer network model trained in the previous iteration; normalizing the content features of the third sample image according to the style features of the second sample image to obtain the sample image features after the process, and generating a corresponding result image according to the sample image features.

Optionally, the initial style transfer network model or the style transfer network model trained in the previous iteration includes an encoder, a normalizing network, and a decoder, which are sequentially connected in cascade, as the VGG Encoder, AdaIN and Decoder shown inside the dashed box in FIG. 5.

The role of the encoder, the normalizing network and the decoder in the initial style transfer network model or the style transfer network model trained in the previous iteration, and the network used are as described above. The weight parameter of the decoder used in each iterative training is obtained according to the previous iteration training adjustment. In the multiple iteration training process, the weight parameter of the decoder may be changed in real time.

The result image generated in step S402 is as shown in the image output on the right side of the dashed box in FIG. 5.

Step S403 includes determining a total image loss of the result image based on the second sample image, the sample image features, and the result image.

Optionally, step S403 includes inputting the second sample image, the sample image features, and the result image into a preset analysis network model; extracting style features of the second sample image and result image features of the result image by the analysis network model; inputting the result image features, the sample image features, and the style features of the second sample image to a preset loss function, and determining the total image loss via the loss function.

Optionally, the analysis network model may include an encoder, where the encoder in the analysis network model is specifically a VGG network, including at least one convolution block, a coding pooling layer, and a coding full connection layer; Each of the convolutional blocks, the coding pooling layer and the coding full connection layer are sequentially connected in cascade. The first convolutional block includes at least one convolutional layer of concatenation, and the other convolutional blocks each include a concatenated pooling layer and at least one convolution layer.

Optionally, the VGG network is a VGG16 network or a VGG19 network, as shown in FIG. 3. In the example of FIG. 5, the analysis network model is the VGG Encoder on the right side of FIG. 5.

As can be seen from FIG. 5, the encoder in the analysis network model can be used to calculate the total image loss, and output the calculated total image loss to the Decoder portion of the aforementioned initial style transfer network model or the style transfer network model trained in the previous iteration.

Optionally, inputting the resulting image features, the sample image features, and the style features of the second sample image into a preset loss function, and determining the total image loss via the loss function includes the following: inputting result image features and sample image features into a first loss function in the loss function, determining a difference between the result image features and the sample image features by using the first loss function, and determining a content loss of the result image according to the difference; inputting the result image features and the style features of the second sample image into a second loss function in the loss function, and determining a mean difference and a variance difference between the result image features and the style features of the second sample image by the second loss function, and determining the style loss of the result image based on the mean difference and the variance difference; and determining the total image loss based on the content loss, the weight of the content loss, the style loss, and the weight of the style loss.

Taking the training process shown in FIG. 5 as an example, after the VGG Encoder on the right side is used as an analysis network model to extract the result image features, the style features of the second sample image, and obtain the sample image features processed by the normalizing network, the result image features and the sample image features can be input into the first loss function. The content loss Lc (or expressed as $L_{content}$) of the result image is determined by the first loss function, and the result image features and the sample style features are input into the second loss function, and the style loss Ls (or expressed as $L_{style}$) of the result image is determined by the second loss function.

Optionally, a calculation principle for the content loss is as follows:

In the analysis network model, the output of each convolutional layer is a feature of the input image. Suppose a convolutional layer with $N_l$ convolution kernels whose output contains $N_l$ feature images, assuming that the size of each feature image is $M_l$ (width×height of the feature image), the output of such a layer can be stored in the matrix $F^l \varepsilon\ R^{N_l \times M_l}$.

The definitions of $\vec{p}$ and $\vec{x}$ are the original input image and the generated image, respectively, and $P^l$ and $F^l$ are the feature images of the output of the layer 1 in the network model, respectively, and the content loss function can be defined as follows:

$$L_{content} = \frac{1}{2C1} \sum_{ij} (F_{ij}^l - P_{ij}^l)^2$$

Where $L_{content}$ is the content loss, and $P_{ij}^l$ represents the value of the j-th position in the feature image (corresponding to the original input image) output by the i-th convolution kernel in the layer 1. $F_{ij}^l$ represents the value of the j-th position in the feature image (corresponding to the generated image) outputted by the i-th convolution kernel in the layer 1, and C1 is a constant for normalizing the result.

In one embodiment, in the training network shown in FIG. 5, the content loss is the Euclidean distance between the content features outputted by the VGG Encoder network on the right side of FIG. 5 and the sample image features outputted by the AdaIN processing layer, which is:

$$L_{content} = \frac{1}{2C1} \|f(g(t)) - f(t)\|_2$$

Wherein, $f(g(t))$ represents the content features extracted and output by the VGG Encoder on the right side of FIG. 5 from the result image outputted by the Decoder in FIG. 5, and $f(t)$ represents the sample image features outputted by the AdaIN processing layer in FIG. 5. The rest of the parameters have the same meaning as before.

Optionally, a calculation principle for style loss is as follows:

Since the AdaIN part shown in FIG. 5 only passes the mean and variance of the sample style features, the style loss does not use the Gram matrix, but use the mean and variance to match the data. The features of the four layers of Relu1_1, Relu2_1, Relu3_1 and Relu4_1 are calculated, that is, the loss of style is only based on the loss of IN statistics. The formula is as follows:

$$L_{style} = \sum_{i=1}^{L} \|\mu(f(g(t))) - \mu(f(s))\|_2 + \sum_{i=1}^{L} \|\sigma(f(g(t))) - \sigma(f(s))\|_2$$

Where $f(g(t))$ is the content features extracted and output by the VGG Encoder on the right side of FIG. 5 from the result image output by the Decoder in FIG. 5, $f(s)$ is the style features extracted and output by VGG Encoder on the right side of FIG. 5 from the sample style image, and μ represents the mean and a represents the variance.

Optionally, the total image loss can be calculated by the following expression:

$$L_{total} = \alpha L_{content} + \beta L_{style}$$

Among them, $L_{total}$, $L_{content}$, $L_{style}$ represent total image loss, content loss, and style loss, respectively, and α and β respectively represent the weight of the content loss and the weight of the style loss in total image loss.

Optionally, the values of α and β can be determined as follows: the initial values of α and β are set according to actual needs, and the initial values can be adjusted according to the total image loss obtained during each iteration of the training in the training process as shown in FIG. 5.

Step S404 includes, according to the total image loss, correcting the weight parameter in the initial style transfer network model or the style transfer network model trained in the previous iteration, and obtain the style transfer network model trained by the iteration.

Optionally, correcting the weight parameter in the initial style transfer network model or the style transfer network model trained in the previous iteration includes: correcting the weight parameter of the decoder in the initial style transfer network model or the style transfer network model trained in the previous iteration.

The initial weight parameter of the decoder can be set according to actual needs or randomly set. During multiple iteration training, the weight parameter of the decoder can be continuously updated and adjusted by the gradient descent, so that the image loss of the result image output by the decoder is continuously reduced, and the network gradually converges.

Figure 6:
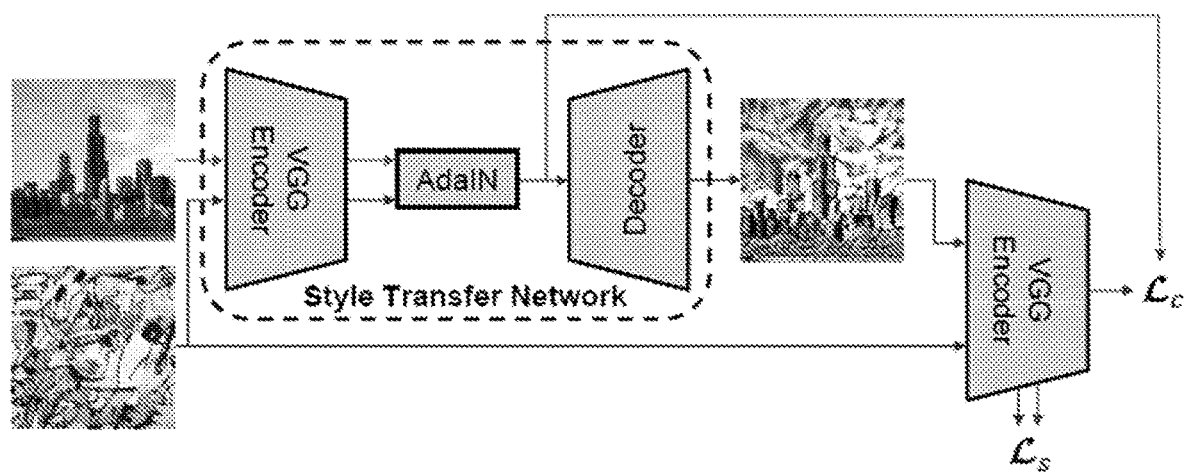
FIG. 6 is another exemplary diagram of a training principle of a style transfer network model in an embodiment of the present application.

Optionally, one embodiment of the present disclosure further provides a training method of the style transfer network model. As shown in FIG. 6, the training process is substantially the same as the training process shown in FIG. 5. The difference is that the sample image input into the initial style transfer network model or the style transfer network model trained in the previous iteration in the training method shown in FIG. 6 is two independent images, not the image after the compositing. There is no need to composite two separate sample images in the training method shown in FIG. 6.

Applying the image processing method provided by one embodiment of the present application can achieve at least the following beneficial effects:

1) One embodiment of the present application may perform compositing of the first image and the second image, and optimize the synthesis effect of the third image after the compositing based on the second image using a pre-trained style transfer network model. The content features of the third image and the style features of the second image may be deeply blended, so that the styles of the third image and the second image after the compositing are highly unified, and are more suitable for different styles of images. It can be applied to the field of smart image pasting to realize real-time and fast smart image pasting.

2) One embodiment of the present application adopts a pre-trained style transfer network model, which can improve the image blending speed of the third image and the second image, and can ensure the blending effect of the merged image. Compared with the prior art of continuing image pixel value optimization after each generation of the blended image, the embodiment of the present application does not need to optimize the image after the blending, which can save the process of image blending, greatly reduce the synthesis time, and can realize real-time processing and blending of the third image and the second image.

3) The prior art often needs to use different image processing methods or models when processing different types of images. Compared with the prior art, the iterative training method of one embodiment of the present application can train a style transfer network model adapted to multiple types of images, and the image blending method based on the trained style transfer network model can be applied to various styles of images.

Figure 7:
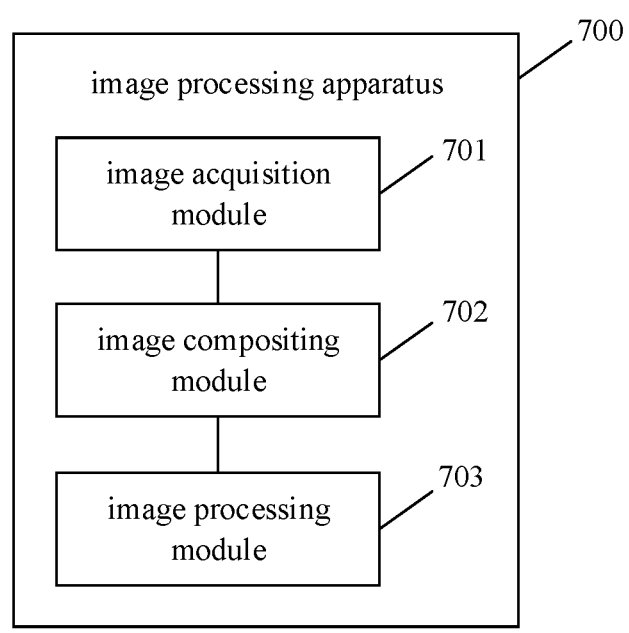
FIG. 7 is a schematic structural diagram of an image processing apparatus according to an embodiment of the present disclosure.

Based on the same inventive concept, an embodiment of the present application provides an image processing apparatus, which can perform the image processing method provided in the foregoing method embodiment. As shown in FIG. 7, in one embodiment, the image processing apparatus 700 includes an image acquisition module 701, an image compositing module 702, and an image processing module 703.

The image acquisition module 701 is configured to acquire a first image and a second image to be processed; the image compositing module 702 is configured to combine the first image and the second image to form a third image after the compositing; The image processing module 703 is configured to extract content features of the third image and style features of the second image by using a pre-trained style transfer network model, perform normalization processing on the content features of the third image according to the style features of the second image to obtain the target image features after the processing, generating corresponding target image according to the target image features, and outputting; The style transfer network model may include: an encoder, a normalizing network, and a decoder that are cascaded sequentially.

Optionally, the image processing module 703 is specifically configured to: extract, by the encoder, content features of the third image and style features of the second image; normalize the content feature of the third image based on the style features of the second image by the normalizing network to obtain the target image features after the processing; generate the corresponding target image based on the target image features by the decoder and output.

Figure 8:
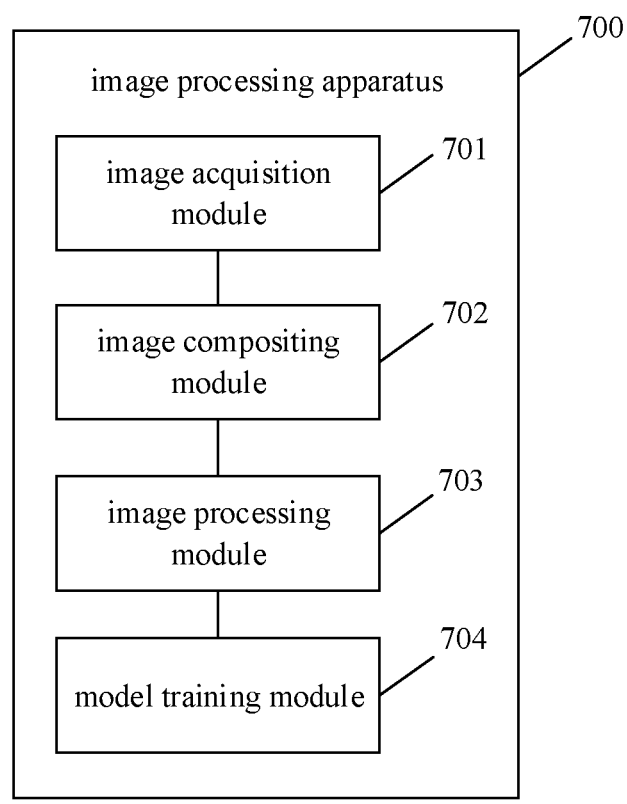
FIG. 8 is a schematic structural diagram of an image processing apparatus according to an embodiment of the present disclosure.

Optionally, as shown in FIG. 8, the image processing apparatus 700 provided by the implementation of the present application further includes: a model training module 704.

The model training module 704 is configured to train the style transfer network model by acquiring at least one set of the first sample image and the second sample image; composite the first sample image and the second sample image in each set to form a third sample image after the compositing; and perform iterative training on the initial style transfer network model according to at least one set of the third sample image and the second sample image until a preset convergence condition is satisfied;

In one embodiment, each iteration of training includes:

Inputting a current set of a third sample image and a second sample image into an initial style transfer network model or a style transfer network model trained in the previous iteration;

Extracting the content features of the third sample image and the style features of the second sample image by using the initial style transfer network model or the style transfer network model trained in the previous iteration; Normalizing the content features of the third sample image according to the style features of the second sample image to obtain the sample image features after the processing, and generating a corresponding result image according to the sample image features;

Determining a total image loss of the result image based on the second sample image, the sample image features, and the result image;

According to the total image loss, the weighting parameters in the initial style transfer network model or the style transfer network model trained in the previous iteration are modified to obtain the style transfer network model trained in this iteration.

Optionally, the model training module 704 is specifically further configured to: input the second sample image, the sample image features, and the result image into a preset analysis network model; extract the style features of the second sample image and the result image features in the result image by analyzing the network model; input the result image features, the sample image features, and the style features of the second sample image into a preset loss function, and determine the total image loss through the loss function.

Optionally, the model training module 704 is specifically configured to: correct the weight parameter of the decoder in the initial style transfer network model or the style transfer network model trained in the previous iteration.

Optionally, the image processing module 703 is specifically configured to: adjust a numerical range of content features of the third image according to a mean and a variance of the content features of the third image, so that content features of the third image match style features of the second image; and add the style features of the second image to the content features of the adjusted third image to obtain target image features.

The image processing apparatus 700 provided by one embodiment of the present application has the same inventive concept and the same beneficial effects as the previous method embodiments. For the content that is not shown in detail in the image processing apparatus 700, reference may be made to the foregoing method embodiments, and details are not described herein again.

Based on the same inventive concept, an embodiment of the present application provides a neural network for smart image pasting. A first image and a third image are inputted into the neural network for smart image pasting. The third image is a composited image formed by the first image and a second image. In one embodiment, the neural network for smart image pasting includes an encode configured to extract content features of the third image and style features of the second image; a normalizing network configured to normalize the content features of the third image based on the style features of the second image to obtain target image features; a decoder configured to generate the target image based on the target image features and outputting the target image.

In one embodiment, the encoder is a first visual geometry group network, including at least one convolutional block, a coding pooling layer, and a coding full connection layer, which are sequentially connected in cascade. The at least one convolutional block include a first convolutional block comprising at least one convolutional layer connected in cascade. Other convolutional blocks each includes a pooling layer and at least one convolutional layer connected in cascade. The normalizing network include an adaptive instance normalization processing layer, and the coding full connection layer is connected to the adaptive instance normalization processing layer. The decoder is a residual network, a dense network, or a network symmetric with the encoder.

In one embodiment, the first visual geometry group network is a VGG16 network or a VGG19 network.

In one embodiment, the neural network for smart image pasting further includes a model training module. The model training module is configured to train the neural network for smart image pasting by: inputting at least one set of a first sample image and a third sample image, the third image being a composited image formed by the first image and a second image; performing iterative training on an initial neural network for smart image pasting based on at least one set of the third sample image and the second sample image until a preset convergence condition is satisfied.

In one embodiment, each iteration of training includes: inputting the current set of the third sample image and the second sample image into the initial neural network for smart image pasting or a neural network for smart image pasting trained in the previous iteration; extracting content features of the third sample image and style features of the second sample image by using the initial neural network for smart image pasting or the neural network for smart image pasting trained in the previous iteration, normalizing the content features of the third sample image based on the style features of the second sample image to obtain sample image features, and generating a corresponding result image based on the sample image features; determining a total image loss of the result image based on the second sample image, the sample image features, and the result image; and correcting a weight parameter in the initial neural network for smart image pasting or the neural network for smart image pasting trained in the previous iteration to obtain the neural network for smart image pasting trained by the iteration based on the total image loss.

In one embodiment, the model training module includes an analysis network model. The analysis network model is configured to input the second sample image, the sample image features and the result image, extract the style features of the second sample image and result image features of the result image, and input the resulting image features, the sample image features and the style features of the second sample image into a loss function, and determine the total image loss by the loss function.

In one embodiment, the analysis network model includes a second visual geometry group network, including at least one convolution block, a coding pooling layer, and a coding full connection layer. The at least one convolution block, the coding pooling layer and the coding full connection layer are sequentially connected in cascade. The at least one convolution block includes a first convolution block including at least one cascaded convolution layer. The convolution blocks each includes a pooling layer and at least one convolution layer connected in cascade.

Figure 9:
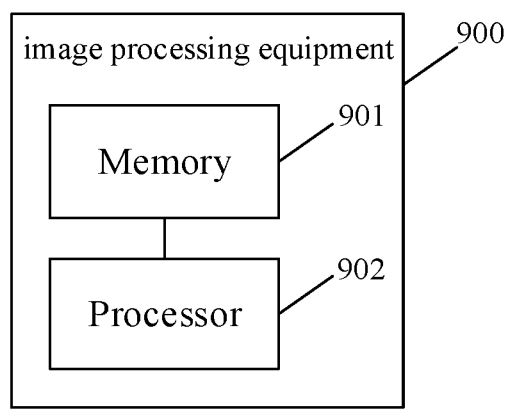
FIG. 9 is a schematic structural diagram of an image processing apparatus according to an embodiment of the present disclosure.

Based on the same inventive concept, an embodiment of the present application provides an image processing equipment. As shown in FIG. 9, the image processing equipment 900 includes a memory 901 and a processor 902.

A computer program is stored on the memory 901 in one embodiment of the present application, and the computer program is executed by the processor 902 to implement the image processing method provided by one embodiment of the present application.

The memory 901 in one embodiment of the present application may be a ROM (Read-Only Memory) or other type of static storage device that can store static information and instructions, and may be a RAM (Random Access Memory) or other types of dynamic storage devices that store information and instructions. It can also be an EEPROM (Electrically Erasable Programmable Read Only Memory), a CD-ROM (Compact Disc Read-Only Memory) or other optical disc storage, a disc storage (including a compact disc, a laser disc, a compact disc, a digital versatile disc, a Blu-ray disc, etc.), a disk storage media or other magnetic storage devices, or any other medium that can be used to carry or store desired program code in the form of an instruction or data structure and that can be accessed by a computer, but is not limited thereto.

The processor 902 in one embodiment of the present application may be a CPU (Central Processing Unit), a general-purpose processor, a DSP (Digital Signal Processor), an ASIC (Application Specific Integrated Circuit), or an FPGA (Field-Programmable Gate Array), or other programmable logic device, transistor logic device, hardware component, or any combination thereof. It is possible to implement or carry out the various illustrative logical blocks, modules and circuits described in connection with the present disclosure. Processor 902 can also be a combination of computing functions, for example, including one or more microprocessor combinations, a combination of a DSP and a microprocessor, and the like.

Those skilled in the art can understand that the image processing equipment 900 provided by some embodiments of the present application can be specially designed and manufactured for the required purpose, or can also include known devices in a general-purpose computer. These devices have computer programs stored therein that are selectively activated or reconfigured. Such computer programs can be stored in a device (e.g., computer readable medium) or in any type of medium suitable for storing electronic instructions and separately coupled to a bus.

The image processing equipment 900 provided by one embodiment of the present application has the same inventive concept and the same beneficial effects as the foregoing embodiments. For the content that is not shown in detail in the image processing equipment 900, reference may be made to the foregoing embodiments, and details are not described herein again.

Based on the same inventive concept, one embodiment of the present application provides a computer readable storage medium, where a computer program is stored, and when the computer program is executed by the processor, the image processing method provided by one embodiment of the present application is implemented.

The computer readable medium includes, but is not limited to, any type of disk (including floppy disk, hard disk, optical disk, CD-ROM, and magneto-optical disk), ROM, RAM, EPROM (Erasable Programmable Read-Only Memory), EEPROM, flash memory, magnetic card or light card. That is, a readable medium includes any medium that is stored or transmitted by a device (e.g., a computer) in a readable form.

The computer readable storage medium provided by one embodiment of the present application has the same inventive concept and the same beneficial effects as the foregoing embodiments. For the content that is not shown in detail in the computer readable storage medium, reference may be made to the foregoing embodiments, and details are not described herein again.

Those skilled in the art can understand that the steps, measures, and solutions in the various operations, methods, and processes that have been discussed in the present application may be alternated, changed, combined, or deleted. Further, other steps, measures, and schemes in the various operations, methods, and processes that have been discussed in this application can also be alternated, modified, rearranged, decomposed, combined, or deleted. Further, the steps, measures, and solutions in the prior art having various operations, methods, and processes disclosed in the present application may also be alternated, modified, rearranged, decomposed, combined, or deleted.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different times. The order of execution thereof is not necessarily performed in sequence, but may be performed alternately or alternately with at least a portion of other steps or sub-steps or stages of other steps.

The above description is only a partial embodiment of the present application, and it should be noted that those skilled in the art could also make some improvements and retouching without departing from the principle of the present application, which should be considered as the scope of protection of this application.

What is claimed is:

1. An image processing method, comprising:
   inputting a first image and a third image to a pre-trained style transfer network model, the third image being a composited image formed by the first image and a second image; and
   extracting content features of the third image and style features of the second image, normalizing the content features of the third image based on the style features of the second image to obtain target image features, and generating a target image based on the target image features and outputting the target image by using the pre-trained style transfer network model.

2. The image processing method according to claim 1, wherein the pre-trained style network model comprises an encoder, a normalizing network and a decoder that are connected in cascade; and
   wherein extracting the content features of the third image and the style features of the second image, normalizing the content features of the third image based on the style features of the second image to obtain the target image features, and generating the target image based on the target image features and outputting the target image by using the pre-trained style transfer network model, comprise:
   extracting the content features of the third image and the style features of the second image by the encoder;
   normalizing the content features of the third image based on the style features of the second image to obtain the target image features by the normalizing network; and
   generating the target image based on the target image features and outputting the target image by the decoder.

3. The image processing method according to claim 2, wherein the style transfer network model is pre-trained by:
   inputting at least one set of a first sample image and a third sample image, the third sample image being formed by compositing the first sample image and a second sample image; and
   iteratively training an initial style transfer network model according to at least one set of the third sample image and the second sample image until a preset convergence condition is satisfied.

4. The image processing method according to claim 3, wherein each iterative training comprises: p1 inputting the current set of the third sample image and the second sample image into the initial style transfer network model or a style transfer network model trained in the previous iteration;
   extracting content features of the third sample image and style features of the second sample image by using the initial style transfer network model or the style transfer network model trained in the previous iteration, normalizing the content features of the third sample image based on the style features of the second sample image to obtain sample image features, and generating a corresponding result image based on the sample image features;
   determining a total image loss of the result image based on the second sample image, the sample image features, and the result image;
   correcting a weight parameter in the initial style transfer network model or the style transfer network model trained in the previous iteration to obtain the style transfer network model trained by the iteration based on the total image loss.

5. The image processing method according to claim 4, wherein determining the total image loss of the result image based on the second sample image, the sample image features, and the result image comprises:
   inputting the second sample image, the sample image features, and the result image into an analysis network model;
   extracting the style features of the second sample image and result image features of the result image by the analysis network model; and
   inputting the resulting image features, the sample image features, and the style features of the second sample image into a preset loss function, and determining the total image loss by the loss function.

6. The image processing method according to claim 5, wherein the analysis network model comprises a second visual geometry group network, including at least one convolution block, a coding pooling layer, and a coding full connection layer;
   the at least one convolution block, the coding pooling layer and the coding full connection layer are sequentially connected in cascade, the at least one convolution block comprises a first convolution block including at least one cascaded convolution layer, and other convolution blocks each including a pooling layer and at least one convolution layer connected in cascade.

7. The image processing method according to claim 5, wherein inputting the result image features, the sample image features, and the style features of the second sample image into the preset loss function, and determining the total image loss by the loss function comprises:
   inputting the result image features and the sample image features into a first loss function in the loss function, determining a difference between the result image features and the sample image features by using the first loss function, and determining a content loss of the result image based on the difference;
   inputting the result image features and the style features of the second sample image into a second loss function in the loss function, and determining a mean difference and a variance difference between the result image features and the style features of the second sample image by the second loss function, and determining a style loss of the result image based on the mean difference and the variance difference; and
   determining the total image loss based on the content loss, a weight of the content loss, the style loss, and a weight of the style loss.

8. The image processing method according to claim 4, wherein correcting the weight parameter in the initial style transfer network model or the style transfer network model trained in the previous iteration comprises modifying weight parameter of the decoder in the initial style transfer network model or the style transfer network model trained in the last iteration.

9. The image processing method according to claim 1, wherein the encoder is a first visual geometry group network, including at least one convolutional block, a coding pooling layer, and a coding full connection layer; which are sequentially connected in cascade, the at least one convolutional block comprising a first convolutional block comprising at least one convolutional layer connected in cascade, and other convolutional blocks each comprising a pooling layer and at least one convolutional layer connected in cascade;

the normalizing network comprises an adaptive instance normalization processing layer, and the coding full connection layer is connected to the adaptive instance normalization processing layer; and the decoder is a residual network, a dense network, or a network symmetric with the encoder.

10. The image processing method according to claim 9, wherein the decoder is the network symmetric with the encoder, the decoder comprising a decoding full connection layer, a decoding pooling layer, and at least one deconvolution block, which are sequentially connected in cascade; the at least one deconvolution block comprises a last deconvolution block comprising at least one deconvolutional layer of concatenation, and a resolution of the target image output by the last deconvolution block being the same as a resolution of the second image or the third image inputted into the encoder, and other deconvolution blocks comprising at least one deconvolutional layer and a pooling layer connected in cascade.

11. The image processing method according to claim 1, wherein normalizing the content features of the third image based on the style features of the second image to obtain the target image features comprises:

adjusting a numerical range of the content features of the third image based on the mean and variance of the content features of the third image, so that the content features of the third image match the style features of the second image; and adding the style features of the second image to the content feature of the adjusted third image to obtain the target image features.

12. The image processing method according to claim 1, wherein the first image has a first style features, the second image has a second style features, the first style features and the second style features are different.

13. The image processing method according to claim 1, wherein the second image is an element copied from a photo, the first image is a drawing.

14. An image processing equipment, comprising: a memory and a processor, the memory storing a computer program, wherein the computer program is executed by the processor to implement the image processing method according to claim 1.

15. An imaging processing apparatus using a neural network for smart image pasting, comprising:

an encoder configured to extract content features of a third image and style features of a second image;

a normalizing network configured to normalize the content features of the third image based on the style features of the second image to obtain target image features;

a decoder configured to generate a target image based on the target image features and outputting the target image; and wherein the first image and the third image are inputted into the neural network for smart image pasting, the third image is a composited image formed by the first image and the second image.

16. The imaging processing apparatus using the neural network for smart image pasting according to claim 15, wherein the encoder is a first visual geometry group network, including at least one convolutional block, a coding pooling layer, and a coding full connection layer; which are sequentially connected in cascade, the at least one convolutional block comprising a first convolutional block comprising at least one convolutional layer connected in cascade, and other convolutional blocks each comprising a pooling layer and at least one convolutional layer connected in cascade;

the normalizing network comprises an adaptive instance normalization processing layer, and the coding full connection layer is connected to the adaptive instance normalization processing layer; and the decoder is a residual network, a dense network, or a network symmetric with the encoder.

17. The imaging processing apparatus using the neural network for smart image pasting according to claim 15, further comprising: a model training module;

wherein the model training module is configured to train the neural network for smart image pasting by: inputting at least one set of a first sample image and a third sample image, the third image is a composited image formed by the first image and a second image; performing iterative training on an initial neural network for smart image pasting based on at least one set of the third sample image and the second sample image until a preset convergence condition is satisfied.

18. The imaging processing apparatus using the neural network for smart image pasting according to claim 17, wherein each iteration of training comprises:

inputting the current set of the third sample image and the second sample image into the initial neural network for smart image pasting or a neural network for smart image pasting trained in the previous iteration;

extracting content features of the third sample image and style features of the second sample image by using the initial neural network for smart image pasting or the neural network for smart image pasting trained in the previous iteration, normalizing the content features of the third sample image based on the style features of the second sample image to obtain sample image features, and generating a corresponding result image based on the sample image features;

determining a total image loss of the result image based on the second sample image, the sample image features, and the result image; and correcting a weight parameter in the initial neural network for smart image pasting or the neural network for smart image pasting trained in the previous iteration to obtain the neural network for smart image pasting trained by the iteration based on the total image loss.

19. The imaging processing apparatus using the neural network for smart image pasting according to claim 17, the model training module comprises an analysis network model, wherein the analysis network model is configured to input the second sample image, the sample image features and the result image, extract the style features of the second sample image and result image features of the result image, and input the resulting image features, the sample image features and the style features of the second sample image into a loss function, and determine the total image loss by the loss function.

20. The imaging processing apparatus using the neural network for smart image pasting according to claim 19, wherein the analysis network model comprises a second visual geometry group network, including at least one convolution block, a coding pooling layer, and a coding full connection layer;

the at least one convolution block, the coding pooling layer and the coding full connection layer are sequentially connected in cascade, the at least one convolution block comprises a first convolution block including at least one cascaded convolution layer, and other convolution blocks each including a pooling layer and at least one convolution layer connected in cascade.

\* \* \* \* \*